(12) United States Patent
Chakraborti et al.

(10) Patent No.: US 9,367,760 B2
(45) Date of Patent: Jun. 14, 2016

(54) COARSE DOCUMENT CLASSIFICATION IN AN IMAGING DEVICE

(71) Applicant: Lexmark International, Inc., Lexington, KY (US)

(72) Inventors: Ranajyoti Chakraborti, Kolkata (IN); Kunal Das, Kolkata (IN); Rajib Dutta, Kolkata (IN); Sabyasachi Samanta, Uttarpara (IN); Subhadeep Samanta, Kolkata (IN)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/950,035

(22) Filed: Nov. 24, 2015

(65) Prior Publication Data

US 2016/0078310 A1    Mar. 17, 2016

Related U.S. Application Data

(62) Division of application No. 14/482,570, filed on Sep. 10, 2014.

(51) Int. Cl.
  *G06K 9/62* (2006.01)
  *G06K 9/48* (2006.01)
  *G06K 9/46* (2006.01)
  *G06K 9/00* (2006.01)

(52) U.S. Cl.
  CPC .............. *G06K 9/48* (2013.01); *G06K 9/00456* (2013.01); *G06K 9/4604* (2013.01); *G06K 9/4652* (2013.01); *G06K 9/6201* (2013.01)

(58) Field of Classification Search
  CPC .......... G06K 9/00718; G06K 9/00797; G06K 9/00664; G06F 17/30257; G06F 17/3024; G06F 17/30265; H04N 1/40062
  See application file for complete search history.

(56) References Cited

U.S. PATENT DOCUMENTS

| | | | | |
|---|---|---|---|---|
| 4,972,499 A * | 11/1990 | Kurosawa | ............... | G06K 9/685 382/177 |
| 5,479,537 A * | 12/1995 | Hamashima | ............. | G06K 9/40 382/199 |
| 5,832,141 A * | 11/1998 | Ishida | ................... | H04N 1/3935 358/448 |
| 5,974,195 A * | 10/1999 | Kawazome | ............... | G06K 9/48 358/447 |
| 6,289,136 B1 * | 9/2001 | Oshino | .................... | G06T 3/403 358/1.2 |
| 6,333,993 B1 * | 12/2001 | Sakamoto | ............. | G06T 7/0081 358/464 |
| 7,319,496 B2 * | 1/2008 | Uchida | .................. | H04N 5/142 348/625 |
| 2010/0278391 A1 * | 11/2010 | Hsu | ....................... | A61B 5/1118 382/106 |

* cited by examiner

*Primary Examiner* — Amir Alavi

(57) ABSTRACT

Systems and methods coarsely classify unknown documents in a group or not with reference document(s). Documents get scanned into digital images. Counts of contours are taken. The closer the counts of the contours of the unknown document reside to the reference document(s), the more likely the documents are all of a same type. Embodiments typify contour analysis, classification acceptance or not, application of algorithms, and imaging devices with scanners, to name a few.

11 Claims, 3 Drawing Sheets

COARSE DOCUMENT CLASSIFICATION IN AN IMAGING DEVICE

This application claims priority as a division of U.S. patent application Ser. No. 14/482,570, entitled "Coarse Document Classification," filed Sep. 10, 2014.

FIELD OF THE EMBODIMENTS

The present disclosure relates to classifying or not unknown documents with a group of reference document(s). It relates further to coarse classification of documents without regard to optical character recognition (OCR). Contour detection in images, count, and analysis typifies the embodiments.

BACKGROUND

In traditional classification environments, a "document" becomes classified or not according to a variety of schemes. Among them, schemes define categories for document placement according to content or attributes of the document, e.g., subject matter, author, document type, size, etc. In automatic classification, a hard copy document becomes digitized for computing actions, such as electronic editing, searching, storing, displaying, etc. Digitization also launches routines, such as machine translation, data extraction, text mining, invoice processing, invoice payment, storage, displaying, sorting, and the like. Optical character recognition (OCR) and image feature detection/extraction are conventional methods used during the routines.

Unfortunately, OCR and feature detection require intensive CPU processes and extended periods of time during execution, thus limiting their effectiveness. OCR and feature detection are both also known to regularly fail their role of extracting data when two or more scanned documents have variations in their resolution, bit-depth, and/or rotation, especially between a trained set of reference documents and an unknown document being evaluated. As such, automated processes often seek manual assistance from a user, including helping recognize and sort documents by identifying one or more key features. However, the problem is compounded, and can become labor intensive, when training complicated documents, multiple versions of the same document, closely matching documents, etc. Also, conventional processing of these documents places practical limits on how many documents can be processed per a given interval and often returns ambiguity with unstructured documents or documents containing no ascertainable text that can be read with OCR.

Solutions to these problems are often obtained by additional and more complicated software routines, which only add to the burden of CPU consumption. For many users, this overly complicates their needs and slows down processing, especially when their classification schemes are of a narrow or regular interest. For example, small businesses needing invoice bill paying and sorting for but a few vendors would enjoy faster and less intensive processing with coarse or gross document sorting, instead of slower/intensive processing with more robust OCR and feature detection models. If such also included the entire elimination of OCR, business owners could achieve even cheaper and faster results, especially with poorly scanned documents, e.g., angled or distorted documents (smudge, wrinkle, etc.), where OCR techniques struggle. What is needed then, are coarse classification schemes for documents. Further needs should also contemplate instructions or software executable on controller(s) for hardware, such as imaging devices. Additional benefits and alternatives are sought when devising solutions.

SUMMARY

The above-mentioned and other problems are solved by coarse document classification. Systems and methods serve as an alternative to OCR and feature detection techniques. Schemes involve contour detection for both training and classification processes. Particular advantages relate to the lack of time/CPU consumption associated with the former and classification of documents even when they become rotated or slightly distorted (smudged, wrinkled etc.).

In a representative embodiment, techniques coarsely classify unknown documents in a group or not with reference document(s) without resort to optical character recognition. Documents get scanned into digital images. Counts of contours are taken. The closer the counts of the contours of the unknown document reside to the reference document(s), the more likely the documents are all of the same type. Embodiments typify contour analysis, classification acceptance or not, application of algorithms, and imaging devices with scanners, to name a few.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described to enable those skilled in the art to practice the invention. It is to be understood that other embodiments may be utilized and that changes may be made without departing from the scope of the invention. The following, therefore, is not to be taken in a limiting sense and the scope of the invention is defined only by the appended claims and their equivalents. In accordance with the features of the invention, methods and apparatus teach coarse document classification.

Figure 1:
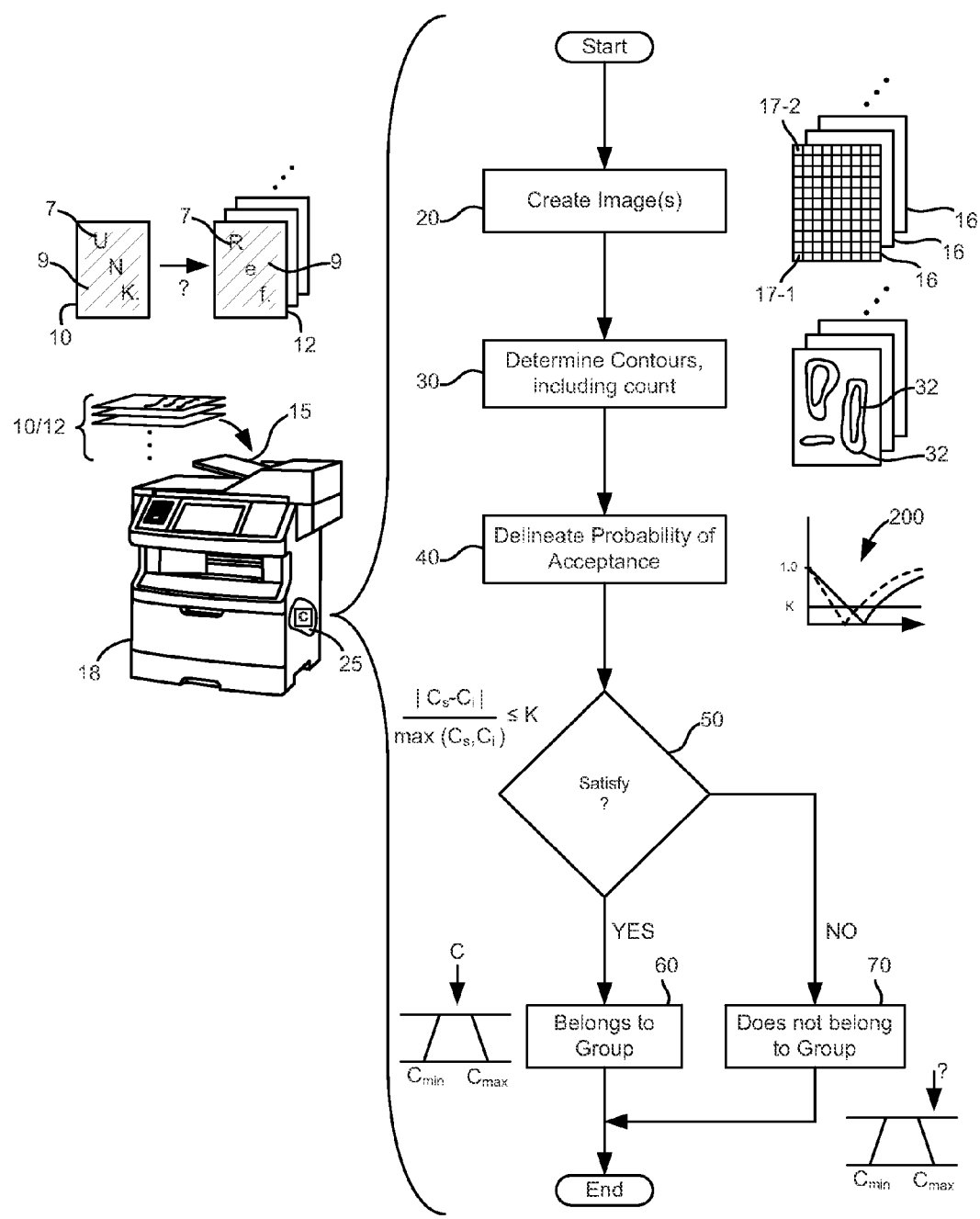
FIG. 1 is a diagrammatic view of a document classification environment, including flow chart according to the present disclosure.

With reference to FIG. 1, an unknown input document 10 is classified or not as belonging to a group of one or more reference documents 12. The documents are any of a variety, but commonly hard copies in the form of invoices, bank statements, tax forms, receipts, business cards, written papers, book, etc. They contain either text 7 and/or background 9. The text typifies words, numbers, symbols, phrases, etc. having content relating to the topic of the document. The background represents the underlying media on which the content appears. The background can also include various colors, advertisements, corporate logos, watermarks, textures, creases, speckles, stray marks, row/column lines, and the like. Either or both the text and background can be formatted in a structured way on the document, such as that regularly occurring with a vendor's invoice, tax form, bank statement, etc., or in an unstructured way, such as might appear with random, unique or unknown documents. When reducing to practice the embodiments of the present disclosure, the inventors conducted actual experiments on structured documents of the type represented by United States tax forms 1040 and W-2.

Regardless of type, the documents 10, 12 have digital images 16 created at 20. The creation occurs in a variety of ways, such as from a scanning operation using a scanner and document input 15 on an imaging device 18. Alternatively, the image comes from a computing device (not shown), such as a laptop, desktop, tablet, smart phone, etc. In either, the image 16 typifies a grayscale, color or other multi-valued image having pluralities of pixels 17-1, 17-2, . . . . The pixels define text and background of the documents 10, 12 according to their pixel value intensities. The amounts of pixels in the images are many and depend in volume upon the resolution of the scan, e.g., 150 dpi, 300 dpi, 1200 dpi, etc. Each pixel also has an intensity value defined according to various scales, but a range of 256 possible values is common, e.g., 0-255. The pixels may also be in binary form (black or white, 1 or 0) after conversion from other values or as a result of image creation at 20. In many schemes, binary creation occurs by splitting in half the intensity scale of the pixels (0-255) and labeling as black pixels those with relatively dark intensities and white pixels those with light intensities, e.g., pixels 17 having intensities ranging from 0-127 become labeled black, while those with intensities from 128-255 become labeled white. Other schemes are also possible.

Regardless, the images in their digital form are next supplied to a controller 25 for further processing. The controller can reside in the imaging device 18 or elsewhere. The controller can be a microprocessor, ASIC, etc. That the document input function 15 to the controller 25 will sometimes result in documents 10, 12 having rotation, skew, wrinkle, etc., and/or that differing documents might have differing resolutions or bit-depth, such becomes largely irrelevant for the next steps of classifying documents which offers great advantage over the prior art, e.g., classifying with OCR.

Upon receipt, the controller applies an algorithm function to the images to determine 30 the edges or contours 32 in the images. As a design implementation, the inventors used a Canny edge detector for defining contours, but other techniques are possible. The controller also notes a numerical count of the contours in each of the images corresponding to the unknown input document and the one or more reference documents. The classification technique of the unknown input document belonging or not to the group of reference documents next uses a formula established by the inventors as comparing the counts of contours. It takes a difference of the counts of contours between the images corresponding to the unknown input document and the one or more reference documents and dividing the difference by a maximum count of contours from either the images corresponding to the unknown input document or the one or more reference documents, whichever is greater. Mathematically, the equation looks as follows:

$$[|Cs-Ci|/\max(Cs,Ci)] \le k, \quad \text{(eqn. 1)}$$

where
Cs=Count of contours 32 in an image 17 corresponding to any of the reference documents 12, e.g., a known or "seed" image,
Ci=Count of contours 32 in an image 17 corresponding to the unknown input image 10, and
max(Cs, Ci)=a maximum count of contours in either the images corresponding to the unknown input document or the one or more reference documents, whichever is greater.

As an example of operation, if the count of contours for Cs=171 and Ci=169, |Cs−Ci|=|171−169|=2, and max(Cs, Ci)=171, or the larger of 171 and 169, whereby [|Cs−Ci|/max (Cs, Ci)] is 2/171=0.012, or 1.2%

The value k in eqn. 1 delineates a probability of acceptance 40 that the unknown input image belongs or not to the group of the one or more reference documents. Naturally, the closer the count Cs is to the count Ci, the closer the match between the unknown and the reference documents. Mathematically, the closer the match between the documents, the closer |Cs−Ci|/(max(Cs,Ci) will be nearer to zero (0). Conversely, the farther away the match between the documents, the greater the value of |Cs−Ci|/(max(Cs,Ci), and farther away from zero.

As has been empirically determined by the inventors, k has been found to work satisfactorily when set in a range from 0 to 0.07 (7%), inclusive. Of course, other values can be derived based on a particular set of documents used for classification and the level of discernment sought when determining matches or not between documents.

Figure 2:
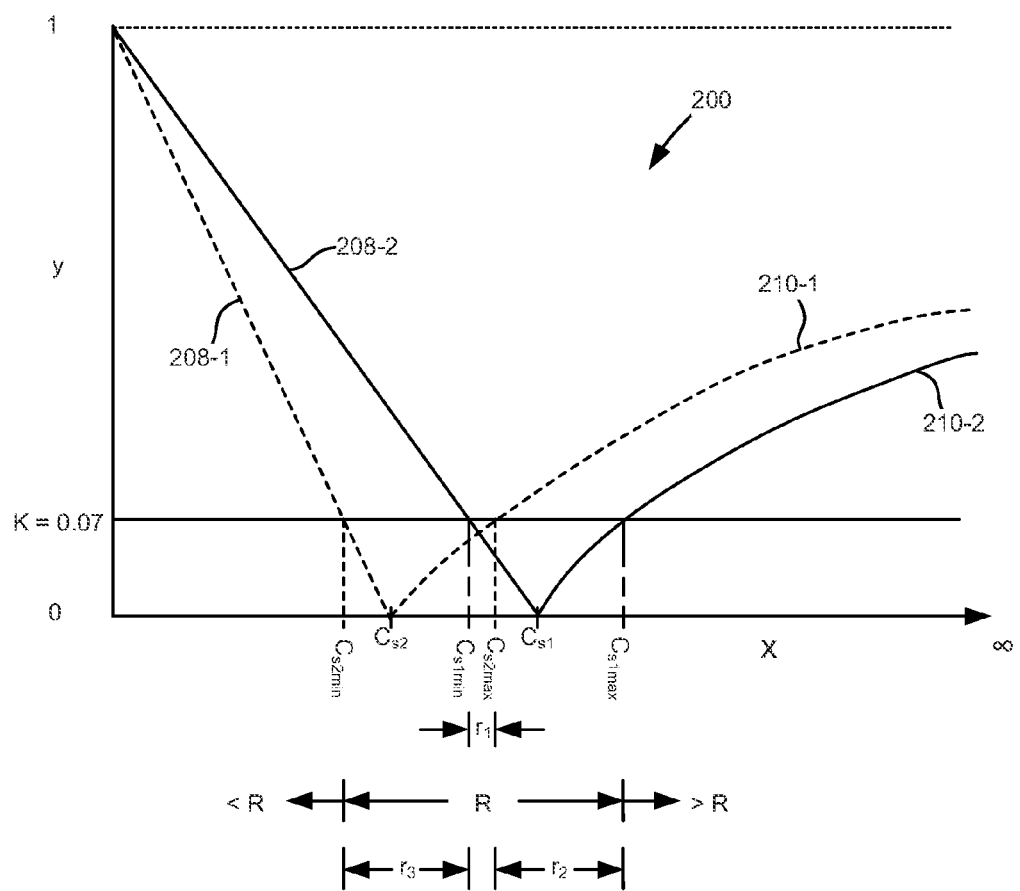
FIG. 2 is a graph showing classification of a class of documents, including probability of acceptance.

With reference to FIG. 2, eqn. 1 above can be converted to:

$$y=(|Cs-Ci|)/(\max(Cs,Ci)), \text{ where } 0 \le y \le 1.$$

If,
x=Ci and
C=Cs,
when $C_i \le C_s$, y becomes $$y = \frac{C-x}{C}$$

or $$y = -\frac{1}{C}x + 1,$$

which corresponds to a linear equation 208 in the form y=mx+b as noted to the left of points Cs1 and Cs2 on the x-axis in the graph 200. On the other hand, when $C_i > C_s$, y becomes $$y = \frac{x-C}{x}$$

or $$x,(y-1) = -C,$$

which corresponds to an equation for a rectangular hyperbola 210 with horizontal asymptote as noted to the right of points Cs1 and Cs2 on the x-axis in the graph 200.

In turn, artisans can deduce that any minimum (min) and maximum (max) values where linear equation 208 and rectangular hyperbola 210 intersect the delineated probability of acceptance, k, in the graph 200, is:

$$C_{z_i min} = C_{z_i}(1-k);$$

and $$C_{s_1 max} = \frac{C_{s_1}}{(1-k)},$$

where i corresponds to an "index" for an image corresponding to a document used to train the system for classification.

For example, graph 200 plots two training documents $C_{s1}$ and $C_{s2}$ of differing type (not belonging to a same classification). There is also a range R of contours for these two reference documents established by the minimum-most point for Cs1 and the maximum-most point for Cs2, inclusive of those points, that fall on their respective curves in graph 200 within the probability of acceptance, k, established at 40, FIG. 1.

Thereafter, images corresponding to an unknown input document 10, FIG. 1, will also have a count of contours that falls within this range (R) or outside this range, either larger or smaller on the x-axis. If the image corresponding to an unknown input document whose contour count falls within the range (r1) $C_{s1min}$–$C_{s2max}$, it can said that the image is either similar to Cs1 or Cs2, which is ambiguous. However, if the image corresponding to the unknown input document whose contour count falls within the range (r2) greater than $C_{s2max}$ and $C_{s1max}$, inclusive, the image can be said to be classified as the type of training document one, or $C_{s1}$. Similarly, if the image corresponding to the unknown input document whose contour count falls within the range (r3) less than $C_{s1min}$ and $C_{s2min}$, inclusive, the image can be said to be classified as the type of training document two, or $C_{s2}$. Any input document whose contour count falls outside of these ranges (<R or >R) returns no match between the unknown input document and the reference or training documents.

Similarly, there is a range of contours that can be established on graph 200 for any number of training documents of a same type (e.g., same classification) or different type (e.g., not belonging to a same classification). In turn, images corresponding to other unknown input documents can be evaluated against the counts of contours in images corresponding to these training documents. Stated differently, given a trained document S with contour count $C_s$, its "range of influence" can be noted as occurring in a range between its min to max, e.g., $C_{smin}$–$C_{smax}$, inclusive of the points. Then, any other unknown document with a contour count within this range can be treated as matching with the document type of S. From eqn. 1, the range of influence can be written as:

$$C_{min} = C(1-z)$$

to $$c_{max} = \frac{c}{1-k}$$

Figure 3:
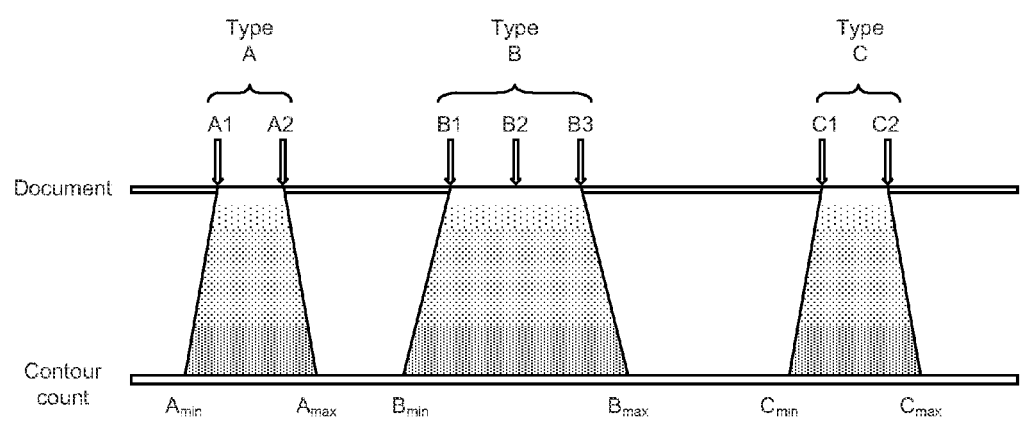
FIG. 3 is a diagrammatic view of a range by which unknown input documents are classified in a group or not of reference documents.

With reference to FIG. 3, the inventors have merged together overlapping ranges for images corresponding to documents of the same type. For example, documents of Types A and C, have two documents in their trained sets as A1 and A2 and C1 and C2, respectively. Their respective minimum and maximums have been merged together to create a larger range of $A_{1min}$–$A_{2max}$ and $C_{1min}$–$C_{2max}$, rewritten as $A_{min}$–$A_{max}$ and $C_{min}$–$C_{max}$. Likewise, documents of Type B have three documents in its trained set, e.g., B1, B2 and B3, and the entire range for counts of contours of these documents runs from $B_{1min}$–$B_{3max}$, rewritten as $B_{min}$–$B_{max}$. Next, during run time when classifying an unknown input document whose contour count falls within one of the ranges, the unknown input document can be classified as that specific document type, and turned into a known document.

As seen back in FIG. 1, contour counts of an unknown input document are compared to those of the one or more reference documents to see if eqn. 1, above, becomes satisfied or not 50. If such falls within the probability of acceptance, k, then that unknown input document belongs to the same classification as the reference documents 60. Else, the unknown input document does not belong to the same classification 70. Graphically, an unknown input document belongs to a group of one or more similar documents of Type C, 60, if its contour count falls between the range $C_{min}$–$C_{max}$. Else 70, the unknown input document remains an unknown classification (?) if its contour count falls outside the range $C_{min}$–$C_{max}$. Of course, if the unknown input document is not classified as falling within a range of contour counts of a certain type, and human intervention reveals that the document should be of that type, the range of contour counts can be adjusted larger to accommodate this fact.

Relative advantages of the foregoing include at least the following: (1) being relatively faster than the art; (2) successfully processing images with various degrees of rotations, imperfections, noise, etc., not currently done in the art absent extensive training of reference documents; (3) can be fully automated as necessary; (4) independent of platform, e.g., Windows, Unix/Linux, etc. and can use open source or not as needed; and (5) storing of data pertaining to reference documents, e.g., trained data, requires relatively little space. Of course, there are limitations to the system. That the foregoing represents only a coarse classification scheme, processing can become bogged down or declared ambiguous if there are too many similar types of documents.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. In an imaging device having a scanned document input and a controller for executing instructions responsive thereto, a method for coarsely classifying whether or not an unknown input document belongs to a group with one or more reference documents, comprising:
   receiving at the controller a scanned input from the scanned document input for each of the unknown input document and the one or more reference documents;
   determining counts of contours of the scanned input for said each of the unknown input document and the one or more reference documents; and
   determining inclusion or not in the group by comparing said counts of contours between images corresponding to the unknown input document and the one or more reference documents.

2. The method of claim 1, further including scanning said each of the unknown input document and the one or more reference documents.

3. The method of claim 2, wherein the scanning does not further initiate processing with optical character recognition.

4. The method of claim 1, further including applying an algorithm with the controller including taking a difference of the counts of contours and dividing the difference by a maximum count of contours from either the unknown input document or the one or more reference documents.

5. The method of claim 1, wherein the determining inclusion or not in the group further includes delineating a probability of acceptance for the counts of contours.

6. The method of claim 5, further including coarsely classifying additional unknown documents relative to the unknown input document upon the determining inclusion or not in the group.

7. The method of claim 1, wherein the determining counts of contours includes applying a same contour algorithm to said each of the unknown input document and the one or more reference documents.

8. The method of claim 1, upon said determining inclusion or not in the group based on the counts of contours, adding or not the unknown input document to the one or more reference documents.

9. In an imaging device having a scanner and a controller for executing instructions responsive thereto, a method for coarsely classifying without OCR whether or not an unknown input document belongs to a group with one or more reference documents, comprising:

scanning each of the unknown input document and the one or more reference documents to form images thereof defined by pixels;

determining counts of contours in the images for said each of the unknown input document and the one or more reference documents;

delineating a probability of acceptance for inclusion or not in the group based on the determined counts of contours; and determining said inclusion or not in the group based on the delineated probability of acceptance.

10. The method of claim 9, further including applying an algorithm with the controller including taking a difference of the counts of contours and dividing the difference by a maximum count of contours from the images of either the unknown input document or the one or more reference documents.

11. The method of claim 10, further including determining whether the applied algorithm results in a lower or higher value than the probability of acceptance.

* * * * *